United States Patent
Hu et al.

(10) Patent No.: US 10,216,925 B2
(45) Date of Patent: Feb. 26, 2019

(54) VIRUS PROTECTION METHOD AND DEVICE

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Zhong Hu, Chaoyang District (CN); Xin Wang, Chaoyang District (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 122 days.

(21) Appl. No.: 15/036,921

(22) PCT Filed: Aug. 26, 2014

(86) PCT No.: PCT/CN2014/085187
§ 371 (c)(1),
(2) Date: May 16, 2016

(87) PCT Pub. No.: WO2015/070653
PCT Pub. Date: May 21, 2015

(65) Prior Publication Data
US 2016/0267267 A1     Sep. 15, 2016

(30) Foreign Application Priority Data
Nov. 15, 2013   (CN) .......................... 2013 1 0575193

(51) Int. Cl.
*G06F 21/51*     (2013.01)
*H04W 12/12*     (2009.01)
(Continued)

(52) U.S. Cl.
CPC ............ *G06F 21/51* (2013.01); *G06F 21/554* (2013.01); *G06F 21/562* (2013.01); *H04W 12/12* (2013.01);
(Continued)

(58) Field of Classification Search
CPC ...... G06F 21/51; G06F 21/554; G06F 21/562; G06F 2221/033; H04W 12/12; H04W 88/02
See application file for complete search history.

(56) References Cited

U.S. PATENT DOCUMENTS

2011/0047597 A1* 2/2011 Mahaffey .............. G06F 21/564
                                                               726/3
2011/0145920 A1* 6/2011 Mahaffey .............. G06F 21/564
                                                               726/22
(Continued)

FOREIGN PATENT DOCUMENTS

| CN | 102810143 A | 12/2012 |
|---|---|---|
| CN | 103092661 A | 5/2013 |
| CN | 102799826 B | 7/2015 |

OTHER PUBLICATIONS

Zhao et al., The Architecture Design of Streaming Media Applications for Android OS, 2012, IEEE Intl Conf Computer Science and Automation Engineering, Jun. 22-24, 2012, pp. 280-283 (Year: 2012).*

(Continued)

Primary Examiner — Luu T Pham
Assistant Examiner — Harvey I Cohen
(74) Attorney, Agent, or Firm — LKGlobal | Lorenz & Kopf, LLP (57) ABSTRACT

The present invention discloses a virus protection method and device. The virus protection method comprises: when an Android operating system needs to install an application, transmitting identification information of the application that needs to be installed from a framework layer to an application layer; at the application layer, activating a virus scanner application on the basis of the identification information of the application to allow the virus scanner application to run a virus scan on the application; acquiring a scan (Continued)

result of the virus scan, issuing a notification to the framework layer of whether or not to execute an installation operation for the application on the basis of the scan result; and at the framework layer, either executing the installation operation for the application or rejecting to execute the installation operation for the application on the basis of the notification.

15 Claims, 4 Drawing Sheets (51) Int. Cl.
G06F 21/55 (2013.01)
G06F 21/56 (2013.01)
H04W 88/02 (2009.01)
(52) U.S. Cl.
CPC ....... G06F 2221/033 (2013.01); H04W 88/02 (2013.01)

(56) References Cited

U.S. PATENT DOCUMENTS

| | | | | |
|---|---|---|---|---|
| 2012/0231763 A1* | 9/2012 | Zeng | ..................... | G06F 21/565 455/410 |
| 2013/0067577 A1* | 3/2013 | Turbin | ................... | G06F 21/56 726/24 |
| 2013/0283377 A1* | 10/2013 | Das | ......................... | G06F 21/51 726/23 |
| 2013/0333039 A1* | 12/2013 | Kelly | ..................... | G06F 21/51 726/24 |
| 2014/0007222 A1* | 1/2014 | Qureshi | ................. | G06F 21/10 726/16 |
| 2014/0041034 A1* | 2/2014 | Li | ........................ | G06F 21/561 726/24 |
| 2014/0090077 A1* | 3/2014 | Jeong | ..................... | G06F 21/51 726/26 |
| 2014/0096240 A1* | 4/2014 | Hay | ...................... | G06F 21/561 726/22 |

OTHER PUBLICATIONS

Zhou et al., Dissecting Android Malware: Characterization and Evolution, IEEE, 2012 IEEE Symposium on Security and Privacy, Jul. 2012, pp. 95-109 (Year: 2012).*
Wei et al., Android Malware Detection via a Latent Network Behavior Analysis, IEEE, 2012 IEEE 11th International Conference onTrust, Security and Privacy in Computing and Communications, Jun. 2012, pp. 1251-1258 (Year: 2012).*
Nolan et al., MCARTA-MaliciousCodeAutomatedRun-TimeAnalysisframework, IEEE, 2012 IEEE Conference on Technologies for Homeland Security (HST), Feb. 2013, pp. 13-17 (Year: 2013).*
Shabtai, Malware Detection on Mobile Devices, IEEE, 2010 Eleventh International Conference on Mobile Data Management, Jun. 2010, pp. 289-290 (Year: 2010).*
State Intellectual Property Office of The People'S Republic of China, Notification of First Office Action in Application No. 201310575193.9 dated Dec. 12, 2015.

* cited by examiner

VIRUS PROTECTION METHOD AND DEVICE

CROSS-REFERENCE TO RELATED APPLICATIONS

This application is a U.S. National-Stage entry under 35 U.S.C. § 371 based on International Application Number PCT/CN2014/085187, filed Aug. 26, 2014 and which claims priority to Chinese Application Number 201310575193.9, filed Nov. 15, 2013, which are all hereby incorporated herein in their entirety by reference.

TECHNICAL FIELD

The present invention relates to virus protection technology, particularly to a virus protection method and device.

BACKGROUND

For a terminal equipment which can access a network, virus protection is very important. In order to realize virus protection, a terminal equipment, especially a smart mobile equipment, is usually provided with a security management application. A main function which the security management application can provide is virus killing.

In order to ensure that a terminal equipment is not infected with a virus as much as possible, the existing security management application usually provides a virus checking and killing function installed by an application. That is, immediately after the terminal equipment completes the installation of an application, the security management application performs a virus scan and virus killing on the application just installed. As a specific example, after an Android operating system based terminal equipment successfully installs an application, the Android operating system will issue corresponding broadcast with respect to the successful installation of the application, and the security management application, after hearing the broadcast, will activate a virus scan, to detect whether or not the application the installation of which is just completed in the terminal equipment is carrying a virus. The security management application can provide corresponding prompting information to a user according to the virus scan result, so that the security management application can execute a corresponding operation according to instruction information input by the user. If the security management application displays to the user a prompting information that "The installed application is carrying a virus and whether to uninstall the application", the security management application, after receiving an uninstallation instruction from the user, uninstalls the application just installed.

During the course in which the present invention is implemented, the inventor found that, the above existing virus protection method does not ensure the security of the terminal equipment as much as possible. Specifically, after a framework layer in the Android operating system successfully installs the application in the terminal equipment, even if the security management application in an application layer of the terminal equipment found out by scanning that the application is carrying a virus and uninstalled the application, the virus has already invaded the terminal equipment along with the successful installation of the application because the framework layer has already installed the application in the terminal equipment, so that before the application is successfully uninstalled by the security management application of the application layer, the virus carried by the application may have done certain harm to the terminal equipment. In addition, other objects, desirable features and characteristics will become apparent from the subsequent summary and detailed description, and the appended claims, taken in conjunction with the accompanying drawings and this background.

SUMMARY

In view of the above problem, the present invention is proposed so as to provide a virus protection method and a corresponding virus protection device for overcome or at least partially solve the above problem.

In accordance with an aspect of the present invention, a virus protection method is provided, the method including: transmitting when an Android operating system needs to install an application, identification information of the application that needs to be installed from a framework layer to an application layer. At the application layer, activating a virus scanner application on the basis of the identification information of the application to allow the virus scanner application to run virus scan on the application. Acquiring a scan result of the virus scan, and issuing a notification to the framework layer of whether or not to execute an installation operation for the application on the basis of the scan result. At the framework layer, either executing the installation operation for the application or rejecting to execute the installation operation for the application on the basis of the notification.

In accordance with another aspect of the present invention, a virus protection device including one or more non-transitory computer readable medium configured to store computer-executable instruction and at least one processor to execute the instructions to cause, when an Android operating system needs to install an application, transmitting identification information of the application that needs to be installed from a framework layer to an application layer—At the application layer, activating a virus scanner application on the basis of the identification information of the application to allow the virus scanner application to run virus scan on the application. Acquiring a scan result of the virus scan, and issuing a notification to the framework layer of whether or not to execute an installation operation for the application on the basis of the scan result. At the framework layer, either executing the installation operation for the application or rejecting the installation operation for the application on the basis of the notification.

In accordance with another aspect of the present invention, a non-transitory computer readable medium in which having instructions stored thereon that, when executed by at least one processor, cause the at least one processor to perform operations for virus protection, which comprises the steps of transmitting, when an Android operating system needs to install an application, identification information of the application that needs to be installed from a framework layer to an application layer. At the application layer, activating a virus scanner application on the basis of the identification information of the application, to allow the virus scanner application to run virus scan on the application. Acquiring a scan result of the virus scan, and issuing a notification to the framework layer of whether or not to execute an installation operation for the application on the basis of the scan result. At the framework layer, either executing the installation operation for the application or rejecting the installation operation for the application on the basis of the notification.

According the virus protection method and device of the present invention, the framework layer notifies the application layer to run virus scan on an application by using the virus scan application before executing the installation operation for the application, in such a way, in the case that the application is carrying a virus, the application layer can notify the framework layer not to execute the installation operation for the application, so that the application carrying a virus can no longer be installed in the terminal equipment by the framework layer, thereby according to the embodiments of the present invention, avoiding the application carrying a virus to be installed in the terminal equipment by the framework layer and potential harm to be done to the terminal equipment, and improving the security of the terminal equipment.

The above explanation is merely an outline of the technical solution of the present application. In order to be able to understand the technical means of the present application more clearly and to be able to implement it in accordance with the contents of the specification, and in order to enable the above and other objects, features and advantages of the present application more evident and comprehensible, the specific embodiments of the present application are particularly described in the following.

BRIEF DESCRIPTION OF THE DRAWINGS

The present invention will hereinafter be described in conjunction with the following drawing Figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Below, the exemplary embodiments of the present disclosure will be described further in detail with reference to the drawings. Although the exemplary embodiments of the present disclosure are showed in the drawings, it should be understood that, the present disclosure can be implemented in various forms and not be limited by the embodiments here set forth. In contrary, these embodiments are provided in order to be able to understand the present disclosure more thoroughly and to be able to transfer the scope of the present disclosure fully to those skilled in the art.

Embodiment 1

The virus protection method. The method of the present embodiment will be explained in connection with FIG. 1 below.

Figure 1:
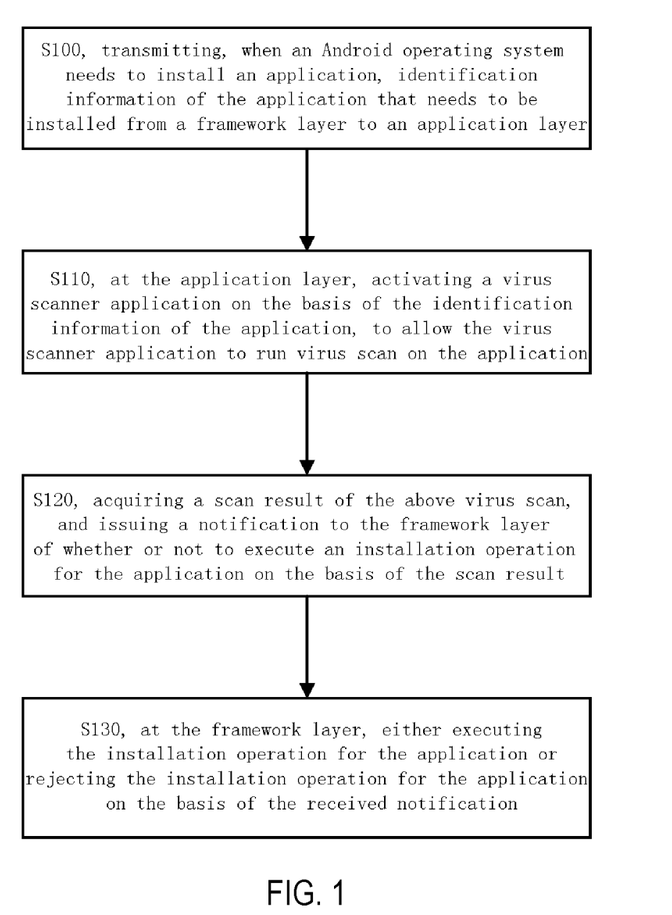
FIG. 1 shows a flowchart of a virus protection method according to Embodiment 1 of the present invention.

In FIG. 1, in S100, when an Android operating system needs to install an application, identification information of the application that needs to be installed is transmitted from a framework layer to an application layer.

Specifically, in the present embodiment, an application installation listening interface function can be provided in the application layer, a service (such as a security service) is provided in the framework layer and a pre-installation package detection interface function is provided for the security service. In such a way, the identification information of the application that needs to be installed can be transmitted to the application installation listening interface function of the application layer through the pre-installation package detection interface function of the security service of the framework layer.

Because when installing an application, the Android operating system will activate a package management service and an application installation interface function in the package management service will be called, in the present embodiment, by modifying the specific implementation flow in the existing application installation interface function, the application can be performed virus scan before executing installation operation for the application, so as to avoid an application carrying a virus to be installed in a terminal equipment.

In the present embodiment, the pre-installation package detection interface function can be provided at the starting position of the application installation interface function. In such a way, when the application installation interface function is called and executed, the specific implementation flow included in the pre-installation package detection interface function in the application installation interface function will be executed first, and the normal installation operation for the application in the application installation interface function will be aborted. One main function of the pre-installation package detection interface function is to save live data of the application installation (for example, to save respective parameter information transferred into the application installation interface function of the package management service by the operating system) and send the identification information of the application that needs to be installed back to the application layer, so that the application layer runs virus scan on the application that needs to be installed.

In the present embodiment, the identification information of the application that needs to be installed can be transmitted from the framework layer to the application layer by way of a callback interface. Specifically, the application layer registers an application installation listener in the framework layer, so that the application layer can obtain the identification information of the application that needs to be installed from the framework layer through the application installation listener.

As a specific example, the security management application (such as 360 security guards) of the application layer can register the application installation listener at the framework layer through a class function for providing a listener. The application installation listening interface function corresponding to the application installation listener will be called by the pre-installation package detection interface function of the framework layer (the application installation listening interface function is a callback function), so that the identifier of the application that needs to be installed will be transmitted from the framework layer to the application layer.

In the present embodiment, the name of the application installation listening interface function can be set in an application installation listener set of the framework layer. In such a way, the pre-installation package detection interface function can acquire the name(s) of one or more callback functions from the application installation listener set (which at least includes the name of the application installation listening interface function) and the pre-installation package detection interface function calls respective callback functions through the acquired name(s), so that the identification information of the application that needs to be installed is transmitted to the respective callback functions.

The above identification information of the application means information which can uniquely locate an application. The identification information of the application can specifically be a URI (Uniform Resource Identifier) of the application and the like.

In S110, at the application layer, a virus scanner application is activated on the basis of the identification information of the application to allow the virus scanner application to run virus scan on the application that needs to be installed.

Specifically, at the application layer, the application installation listening interface function can provide the identification information of the application to the virus scanner application in the terminal equipment (the virus scanner application can also be referred to as the security management application such as the existing virus killing application) and trigger the virus scanner application to run the virus scan on the application corresponding to the identification information of the application In S120, a scan result of the above virus scan is acquired, and a notification is issued to the framework layer of whether or not to execute an installation operation for the application on the basis of the scan result.

Specifically, in the present embodiment, after the virus scanner application (which can be included in the security management application) completes the virus scan on the application that needs to be installed, and generates and outputs the result of the virus scan, a corresponding notification can be issued to the framework layer by using an application installation resuming class function or an application installation terminating class function in the application layer, so that the application installation interface function in the framework layer knows whether or not to execute the installation operation for the application.

As a specific example, after completing the virus scan operation, the security management application calls the application installation resuming class function or the application installation terminating class function in the application layer and sets input parameters of the application installation resuming class function or the application installation terminating class function in the application layer on the basis of the virus scan result. The application installation resuming class function or the application installation terminating class function in the application layer then calls an application installation resuming class function or an application installation terminating class function provided by the service of the framework layer, to notify the framework layer of whether or not to execute the installation operation for the application.

In the present embodiment, after the virus scanner application has successfully performed the virus scan operation the security management application can automatically issue a notification directly to the framework layer of whether or not to execute the installation operation for the application on the basis of the virus scan result. As a specific example, in the case that the security management application does not find that the application that needs to be installed is carrying a virus, the security management application directly calls the application installation resuming class function or the application installation terminating class function in the application layer and calls the application installation resuming class function or the application installation terminating class function provided by the service of the framework layer through the application installation resuming class function or the application installation terminating class function in the application layer, to notify the framework layer to perform the installation operation for the application. As another specific example, in the case that the security management application finds that the application that needs to be installed is carrying a virus, the security management application directly calls the application installation resuming class function or the application installation terminating class function in the application layer and calls the application installation resuming class function or the application installation terminating class function provided by the service of the framework layer through the application installation resuming class function or the application installation terminating class function in the application layer, to notify the framework layer not to perform the installation operation for the application.

In the present embodiment, after the virus scanner application has successfully performed the virus scan operation the security management application can also issue a notification to the framework layer of whether or not to execute the installation operation for the application on the basis of the virus scan result and instruction information from the user. As a specific example, in the case that the security management application finds that the application is carrying a virus, the security management application prompts the user that "it is found by scanning that the application is carrying a virus, do you still want to install this application", and the security management application calls the application installation resuming class function or the application installation terminating class function in the application layer on the basis of the instruction information input by the user and calls the application installation resuming class function or the application installation terminating class function provided by the service of the framework layer through the application installation resuming class function or the application installation terminating class function in the application layer, to notify the framework layer whether or not to perform the installation operation for the application.

In S130, at the framework layer, the installation operation for the application is executed or rejected on the basis of the received notification.

Specifically, in the case that it is determined according to the input parameters of the application installation resuming class function or the application installation terminating class function in the application layer that the installation operation for the application needs to be executed, the application installation resuming class function or the application installation terminating class function provided by the service of the framework layer shall acquire the aforementioned saved live data first, provide the live data to the application installation interface function and trigger the application installation interface function to execute the installation operation for the application, to allow the application successfully to be installed in the terminal equipment. In the case that it is determined according to the input parameters of the application installation resuming class function or the application installation terminating class function in the application layer that the installation operation for the application does not need to be executed, the application installation resuming class function or the application installation terminating class function provided by the service of the framework layer can directly discard the aforementioned saved live data and no longer trigger the application installation interface function to execute the installation operation for the application, so that the application will not be installed in the terminal equipment.

As a specific example, there exists only one application installation interface function in the framework layer and a flag for a resuming installation operation is included in the input parameters of the application installation interface function. In the case that the flag indicates the resuming installation operation, the application installation interface function, when being called, will no longer execute the pre-installation package detection interface function therein. And in the case that the flag indicates a non-resuming installation operation, the application installation interface function, when being called, shall execute the pre-installation package detection interface function therein. In such a way, in the case that it is determined that the installation operation for the application needs to be executed, the application installation resuming class function or the application installation terminating class function provided by the service of the framework layer calls the application installation interface function, provides the above saved live data to the application installation interface function and sets the flag for the resuming installation operation to be a value for characterizing the resuming installation operation, so that the application installation interface function will no longer call the pre-installation package detection interface function, instead directly execute the installation operation for the application, and the application will be installed in the terminal equipment. In the case that it is determined that the installation operation for the application does not need to be executed, the application installation resuming class function or the application installation terminating class function provided by the service of the framework layer can directly discard the aforementioned saved live data.

As another specific example, there simultaneously exist two application installation interface functions in the framework layer. These two application installation interface functions can be distinguished by the function names (for example, an application installation interface function A and an application installation interface function B), one of which is an application installation interface function modified by the present invention (that is, including the pre-installation package detection interface function) and the other is an application installation interface function which is not modified by the present invention (that is, the existing application installation interface function). The application installation interface function which is not modified by the present invention cannot be called directly from the outside (for example, cannot be directly called by the package management service) and only can be called by the application installation resuming class function or the application installation terminating class function provided by the service of the framework layer. In such a way, in the case that it is determined that the installation operation for the application needs to be executed, the application installation resuming class function or the application installation terminating class function provided by the service of the framework layer calls the application installation interface function which is not modified by the present invention, and provides the above saved live data to the application installation interface function which is not modified by the present invention, so that the installation operation for the application will be executed and the application will be installed in the terminal equipment. The application installation resuming class function or the application installation terminating class function provided by the service of the framework layer, in the case that it is determined that the installation operation for the application does not need to be executed, can directly discard the aforementioned saved live data.

It should be particularly noted that, in the present embodiment, in the case that the virus scan result is that the application is carrying a virus, the application layer (for example, the security management application) can directly delete the application; or the application layer (for example, the security management application) can also prompts the user first whether or not the application needs to be deleted. If the user instructs to delete the application, then the application layer (for example, the security management application) will delete the application, otherwise the application layer (for example, the security management application) will not delete the application.

It can be known from the above description of the embodiment, in the present embodiment, a Hook can be added in the application installation interface function in the framework layer of the Android operating system. In such a way, the original installation process of the application is aborted, the application installation interface function will callback the interface function of the security management application first, to notify the application layer of this event of installation of the application. Then, the application layer can determine whether or not to continue the installation flow for the application at the framework layer on the basis of the virus scan result; so that the application carrying a virus can be prevented from being installed in the terminal equipment.

Embodiment 2

The virus protection method. The method of the present embodiment will be explained by exemplifying the Android operating system 4.2.2 in connection with FIG. 2 below.

Figure 2:
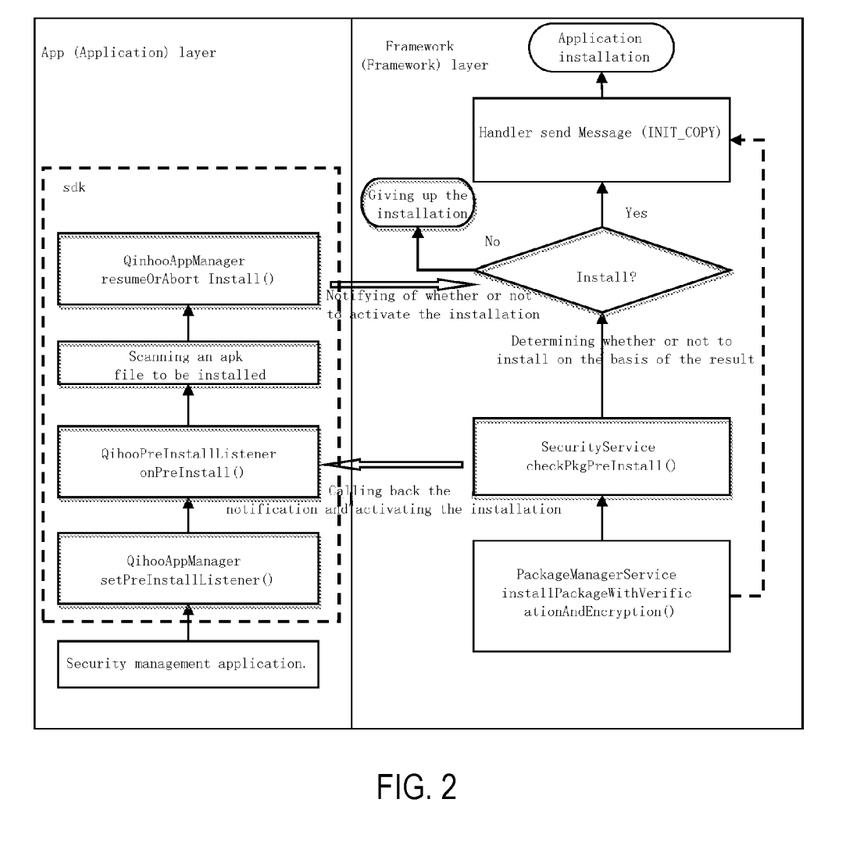
FIG. 2 shows a flowchart of a virus protection method according to Embodiment 2 of the present invention.

At the application (App) layer, a class function and an interface function as shown in Table 1 and Table 2 will be defined for the security management application (such as 360 security guards) by using an SDK (Software Development Kit), so that the application layer and the Framework layer perform information interaction:

TABLE 1

Interface
QihooPreInstallListener
Method (that is, function)
Void type    onPreInstall(Uri Uri)
             is an interface function corresponding to the
             application installation listener.
             Before an application is installed, the framework
             layer calls this callback function, to notify the
             application layer of the Uri of the application that
             needs to be installed.

TABLE 2

Class
QihooAppManager
Method (that is, function)
Boolean    setPreInstallListener(Uri uri,
type       QihooPreInstallListener listener)
           for registering the application installation listener
           into the framework layer of the operating system. In
           such a way, when the application is installed, the
           interface function corresponding to the application
           installation listener will be called back by the TABLE 2-continued framework layer.
resumeOrAbortInstall(String packageName, boolean abort)
for notifying the framework layer whether nor not to
continue to install the App (the application); it will
call the interface function resumeOrAbortInstall( ) of
the SecurityService of the framework layer.

In the framework layer, a service is newly added. The name of the service can be SecurityService (network security service) and the service provides the following interface function:

// before the actual installation of the application begins, the interface function shown in Table 1 is called, to notify the security management application of the application layer, of the fact that there is an application to be installed in the terminal equipment:

```
public boolean checkPkgPreInstall(Uri packageURI,
    IPackageInstallObersver observer,
    int flags,
    String installerPackageName,
    VerificationParams VerificationParams,
    ContainerEncryptionParams encryptionParams)
```

The above packageURI, observer, flags, installerPackageName, VerificationParams and encryptionParams are live data which should be saved when the normal installation operation for the application is aborted, and the packageURI, observer, flags, installerPackageName, VerificationParams and encryptionParams are usually also the information transferred into the package management service by the operating system.

// notifying the package management service (PackageManagerService) of whether or not to install the specified application, that is, whether or not to trigger the actual installation operation:

// uri: indicates position information of the application

// abort: true indicates giving up the installation of the application, and false indicates installing the application.

public void resumeOrAbortInstall(Uri uri, boolean abort)

It should be particularly noted that, the above checkPkgPreInstall ( ) is content newly added at the starting position of the application installation interface function (i.e., the interface function installPackageWithVerificationAndEncryption( )) in the embodiment of the present invention. That is, the existing application installation interface function is modified in the present invention. Below, the modification will be explained in detail by exemplifying a specific example.

Setting the existing application installation interface function in the package management service is:

```
public void installPackageWithVerificationAndEncryption
(Uri packageURI,
    IPackageInstallObserver observer,
    int flags,
    String installerPackageName,
    VerificationParams verificationParams,
    ContainerEncryptionParams encryptionParams)
```

In the embodiment of the present invention, the above existing application installation interface function in the package management service is modified in the following two aspects:

Modification 1: the above existing application installation interface function in the package management service is directly renamed as installPackageWithVerificationAndEncryptionOrigin ( ). That is, in the case that the content in the function is kept unchanged, a word Origin is added behind the name of the original application installation interface function, to indicate that the application installation interface function is the original application installation interface function.

Modification 2: an application installation interface function is newly added. The function name and parameters of the newly added application installation interface function are completely the same as those of the original application installation interface function, only with the content in the function changed, referring to the following description:

```
public void installPackageWithVerificationAndEncryption
(Uri packageURI,
    IPackageInstallObserver observer,
    int flags, String installerPackageName,
    VerificationParams verificationParams,
    ContainerEncryptionParams encryptionParams)
```

// checkPkgPreInstall is mainly used to check whether or not there is an application which registers a application installation listener and the like;

// if there is no application which registers the application installation listener, then false is returned; otherwise, the interface function onPreInstall( ) corresponding to the application installation listener is called back, to notify the application layer to run a virus scan on the application that needs to be installed.

```
boolean holdInstall = QSSecurityProxy.checkPkgPreInstall
(packageURI, observer,
    flags,installerPackageName,
    verificationParams, encryptionParams);
```

// if holdInstall is true, then it indicates that the installation of the current application should be suspended and the installation operation for the application will not executed. Whether or not to execute the installation for the application later should not be determined until the application layer calls the resumeOrAbortInstall ( ) of the framework layer.

// if holdInstall is false, then it indicates that the aforementioned case occurs, and the installation should not be aborted and the original installation interface will be called directly.

```
if (holdInstall == true) {
    Slog.i(TAG, "Suspend install precedure for " + packageURI.getPath(
));
}else {
    installPackageWithVerificationAndEncryptionOrigin(packageURI,
    observer, flags, installerPackageName, verificationParams,
    encryptionParams);-
}
}
```

In addition, some of the codes of the resumeOrAbortInstall ( ) in the framework layer are as shown in the following:

```
public void resumeOrAbortInstall(Uri uri, boolean abort)
{ // the parameter abort indicates whether or not to abort the installation of the
application
... ...
... ...
try {
if (abort == true) {// the installation of the application needs to be aborted and it is
directly called back to notify the operating system of the installation result for the applica-
tion
(failed)
installParams.observer.packageInstalled(null,
PackageManager.INSTALL_FAILED_INTERNAL_ERROR);
return;
} else {// the application should continue to be installed and the application installation
interface function with the function name changed is called
IPackageManager pm = QSServiceUtil.getPm( );
pm.installPackageWithVerificationAndEncryptionOrigin(installParams.packageURI,
installParams.observer, installParams.flags, -
installParams.installerPackageName,
installParams.verificationParams,
installParams.encryptionParams);
}
} catch (RemoteException re) {
Log.e(TAG, re.getMessage( ), re);
}
}
}
```

In FIG. 2, firstly, the security management application can call the class function setPreInstallListener in the QihooAppManager to register the application installation listener in the framework layer. When the application needs to be installed, the operating system calls the interface function installPackageWithVerificationAndEncryption ( ) provided by the package management service, at the starting position of the interface function, the interface function checkPkgPreInstall ( ) provided by the security service is provided. The interface function checkPkgPreInstall ( ), after saving the live data, calls back onPreInstall (Uri Uri) according to the above registered application installation listener. In such a way, the framework layer does not execute the actual installation operation, instead notifies the security management application of this installation event first through the aforementioned application installation listener, so that the security management application can immediately run virus scan on the application which needs to be installed on the basis of the calling of the onPreInstall (Uri Uri). Then, the security management application calls the class function resumeOrAbortInstall ( ) of the application layer. The specific value of the second parameter in this class function is determined by the security management application on the basis of the virus scan result. The class function resumeOrAbortInstall ( ) notifies the framework layer of whether or not to execute the installation operation for the application by calling the resumeOrAbortInstall ( ) provided by the network security service of the framework layer. In the case that the resumeOrAbortInstall ( ) provided by the network security service of the framework layer determines that the installation operation for the application needs to be executed, the interface function installPackageWithVerificationAndEncryptionOrigin ( ) which is not modified by the present invention is called, and the above saved live data are provided to the interface function installPackageWithVerificationAndEncryptionOrigin ( ), and the interface function installPackageWithVerificationAndEncryptionOrigin ( ) will execute the installation operation for the application, for example, execute the operation such as sendMessage (INIT_COPY) shown in FIG. 2. In the case that the resumeOrAbortInstall ( ) provided by the network security service of the framework layer determines that the installation operation for the application does not need to be executed, the resumeOrAbortInstall ( ) provided by the network security service of the framework layer can directly discard the above saved live data, so as to end the installation operation for the application.

The rightmost dashed line in FIG. 2 indicates that, the existing application installation interface function will directly execute the installation operation for the application after being called, for example, execute the operation such as sendMessage (INIT_COPY) shown in FIG. 2. In the present embodiment, the existing installation operation for the application is completely changed.

It can be known from the above description that, in the embodiment of the present invention, the application installation interface function in the framework layer of the Android operating system is modified. A hook is inserted in the existing installation flow of the application installation interface function. In such a way, before the application installation interface function executes the installation operation for the application, a virus scan will be run on the application that needs to be installed by a virus scan application first, so that the embodiment of the present invention allows the installation operation no longer to be executed with respect to the application carrying a virus, which allows the application carrying a virus no longer to be installed in the terminal equipment. Finally, the embodiment of the present invention avoids the potential harm to the terminal equipment due to the application carrying a virus being installed in the terminal equipment.

Embodiment 3

The virus protection device. The device will be explained in detail in connection with FIG. 3 below.

Figure 3:
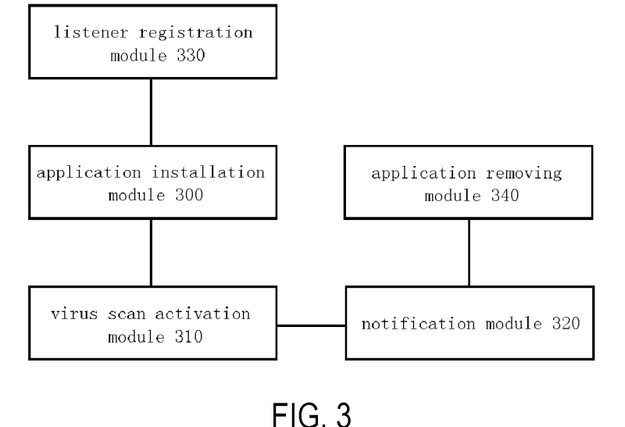
FIG. 3 shows a schematic diagram of a virus protection device according to Embodiment 3 of the present invention.

The device shown in FIG. 2 can be provided in an intelligent electronic equipment such as a computer, a smart mobile phone or a table and the like. And the device mainly includes: an application installation module 300, a virus scan activation module 310, a notification module 320, a listener registration module 330 and an application removing module 340; wherein the application installation module 300 is connected with the listener registration module 330, the virus scan activation module 310 is connected with the application installation module 300 and notification module 320 respectively, and the notification module 320 is also connected with the application removing module 340.

The application installation module 300 is mainly configured to, when an Android operating system needs to install an application, transmit identification information of the application that needs to be installed from a framework layer to an application layer.

Specifically, in the present embodiment, an application installation listening interface function can be provided in the application layer, a service (such as a security service) is provided in the framework layer and a pre-installation package detection interface function is provided for the security service, the pre-installation package detection interface function being provided in the application installation module 300. In such a way, the application installation module 300 can transmit the identification information of the application that needs to be installed to the application installation listening interface function of the application layer through the pre-installation package detection interface function of the security service of the framework layer.

Because when installing the application, the Android operating system will activate a package management service and an application installation interface function in the package management service (the application installation interface function belongs to the application installation module 300) will be called, in the present embodiment, by modifying the specific implementation flow in the existing application installation interface function, the application can be performed virus scan before executing installation operation for the application, so as to avoid an application carrying a virus to be installed in a terminal equipment.

In the present embodiment, the pre-installation package detection interface function can be provided at the starting position of the application installation interface function. In such a way, when the application installation interface function is called and executed, the specific implementation flow included in the pre-installation package detection interface function in the application installation interface function will be executed first, and the normal installation operation for the application in the application installation interface function will be aborted. One main function of the pre-installation package detection interface function is to save live data for the application installation (for example, to save respective parameter information transferred into the application installation interface function of the package management service by the operating system) and send the identification information of the application that needs to be installed back to the application layer, so that the application layer runs virus scan on the application that needs to be installed.

In the present embodiment, the identification information of the application that needs to be installed can be transmitted from the framework layer to the application layer by way of a callback interface. Specifically, the listener registration module 330 in the application layer registers an application installation listener in the framework layer, so that the virus scan activation module 310 in the application layer can obtain the identification information of the application that needs to be installed from the framework layer through the application installation listener.

As a specific example, the listener registration module 330 in the security management application (such as 360 security guards) of the application layer can register the application installation listener at the framework layer through a class function for providing a listener. The application installation listening interface function corresponding to the application installation listener will be called by the pre-installation package detection interface function in the application installation module 300 of the framework layer, so that the identifier of the application that needs to be installed will be transmitted from the framework layer to the application layer.

The listener registration module 330 can set the name of the application installation listening interface function in an application installation listener set of the framework layer. In such a way, the pre-installation package detection interface function in the application installation module 300 can acquire the names of one or more callback functions from the application installation listener set (which at least includes the name of the application installation listening interface function) and the pre-installation package detection interface function calls respective callback functions through the names acquired, so that the application installation module 300 transmits the identification information of the application that needs to be installed to the respective callback functions.

The above identification information of the application means information which can uniquely locate an application. The identification information of the application can specifically be a URI of the application and the like.

The virus scan activation module 310 is mainly configured to, at the application layer, activate a virus scanner application on the basis of the identification information of the application to allow the virus scanner application to run virus scan on the application that needs to be installed.

Specifically, at the application layer, the application installation listening interface function in the virus scan activation module 310 can provide the identification information of the application to the virus scanner application in the terminal equipment (the virus scanner application can also be referred to as the security management application such as the existing virus killing application) and trigger the virus scanner application to run the virus scan on the application corresponding to the identification information of the application The notification module 320 is mainly configured to acquire a scan result of the virus scan, and a notification is issued to the framework layer of whether or not to execute an installation operation for the application on the basis of the scan result.

Specifically, after the virus scanner application (i.e., the security management application) completes the virus scan on the application that needs to be installed, and generates and outputs the result of the virus scan, the notification module 320 can issue a corresponding notification to the framework layer by using an application installation resuming class function or an application installation terminating class function in the application layer, so that the application installation interface function in the framework layer knows whether or not to execute the installation operation for the application.

As a specific example, after the virus scanner application executes the virus scan operation, the notification module 320 calls the security management application calls the application installation resuming class function or the application installation terminating class function in the application layer and sets input parameters of the application installation resuming class function or the application installation terminating class function in the application layer on the basis of the virus scan result. The application installation resuming class function or the application installation terminating class function in the application layer then calls an application installation resuming class function or an application installation terminating class function provided by the service of the framework layer, to notify the framework layer of whether or not to execute the installation operation for the application.

In the present embodiment, after the virus scanner application has successfully performed the virus scan operation, the notification module 320 automatically issues a notification directly to the framework layer of whether or not to execute the installation operation for the application on the basis of the virus scan result. As a specific example, in the case that the virus scanner application does not find that the application that needs to be installed is carrying a virus, the notification module 320 directly calls the application installation resuming class function or the application installation terminating class function in the application layer and calls the application installation resuming class function or the application installation terminating class function provided by the service of the framework layer through the application installation resuming class function or the application installation terminating class function in the application layer, to notify the framework layer to perform the installation operation for the application. As another specific example, in the case that the virus scanner application finds that the application that needs to be installed is carrying a virus, the virus scanner application directly calls the application installation resuming class function or the application installation terminating class function in the application layer and calls the application installation resuming class function or the application installation terminating class function provided by the service of the framework layer through the application installation resuming class function or the application installation terminating class function in the application layer, to notify the framework layer not to perform the installation operation for the application.

In the present embodiment, after the virus scanner application has successfully performed the virus scan operation, the notification module 320 can also issue a notification to the framework layer of whether or not to execute the installation operation for the application on the basis of the virus scan result and instruction information from the user. As a specific example, in the case that the virus scanner application finds that the application is carrying a virus, the notification module 320 prompts the user that "it is found by scanning that the application is carrying a virus, do you still want to install this application", and the notification module 320 calls the application installation resuming class function or the application installation terminating class function in the application layer on the basis of the instruction information input by the user and calls the application installation resuming class function or the application installation terminating class function provided by the service of the framework layer through the application installation resuming class function or the application installation terminating class function in the application layer, to notify the framework layer whether or not to perform the installation operation for the application.

The application installation module 300 is mainly further configured to execute the installation operation for the application or reject the installation operation for the application on the basis of the notification from the notification module 320.

Specifically, in the case that it is determined according to the input parameters of the application installation resuming class function or the application installation terminating class function in the application layer that the installation operation for the application needs to be executed, the application installation resuming class function or the application installation terminating class function (which belongs to the application installation module 300) provided by the service of the framework layer shall acquire the aforementioned saved live data first, provide the live data to the application installation interface function and trigger the application installation interface function to execute the installation operation for the application, to allow the application to be successfully installed in the terminal equipment. In the case that it is determined according to the input parameters of the application installation resuming class function or the application installation terminating class function in the application layer that the installation operation for the application does not need to be executed, the application installation resuming class function or the application installation terminating class function provided by the service of the framework layer can directly discard the aforementioned saved live data and no longer trigger the application installation interface function to execute the installation operation for the application, so that the application will not be installed in the terminal equipment.

As a specific example, there exists only one application installation interface function in the application installation module 300 and a flag for a resuming installation operation is included in the input parameters of the application installation interface function. In the case that the flag indicates the resuming installation operation, the application installation interface function, when being called, will no longer execute the pre-installation package detection interface function therein. And in the case that the flag indicates a non-resuming installation operation, the application installation interface function, when being called, shall execute the pre-installation package detection interface function therein. In such a way, the application installation resuming class function or the application installation terminating class function in the application installation module 300, in the case that it is determined that the installation operation for the application needs to be executed, calls the application installation interface function, provides the above saved live data to the application installation interface function and sets the flag for the resuming installation operation to be a value for characterizing the resuming installation operation, so that the application installation interface function will no longer call the pre-installation package detection interface function, instead directly execute the installation operation for the application, and the application will be installed in the terminal equipment. The application installation resuming class function or the application installation terminating class function provided by the service of the framework layer, in the case that it is determined that the installation operation for the application does not need to be executed, can directly discard the aforementioned saved live data.

As another specific example, there simultaneously exist two application installation interface functions in the application installation module 300. These two application installation interface functions can be distinguished by the function names (for example, an application installation interface function A and an application installation interface function B), one of which is an application installation interface function modified by the present invention (that is, including the pre-installation package detection interface function) and the other is an application installation interface function which is not modified by the present invention (that is, the existing application installation interface function). The application installation interface function which is not modified by the present invention cannot be called directly from the outside (for example, cannot be directly called by the package management service) and only can be called by the application installation resuming class function or the application installation terminating class function (belongs to the application installation module 300) provided by the service of the framework layer. In such a way, the application installation resuming class function or the application installation terminating class function provided by the service of the framework layer, in the case that it is determined that the installation operation for the application needs to be executed, calls the application installation interface function which is not modified by the present invention, and provides the above saved live data to the application installation interface function which is not modified by the present invention, so that the installation operation for the application will be executed and the application will be installed in the terminal equipment. The application installation resuming class function or the application installation terminating class function provided by the service of the framework layer, in the case that it is determined that the installation operation for the application does not need to be executed, can directly discard the aforementioned saved live data.

In the present embodiment, in the case that the virus scan result is that the application is carrying a virus, the application removing module 340 provided in the application layer can directly delete the application; or the application removing module 340 can also prompts the user first whether or not the application needs to be deleted. If the user instructs to delete the application, then the application removing module 340 will delete the application, otherwise the application removing module 340 will not delete the application.

The algorithm and display provided here are not inherently related to any particular computer, virtual system or other equipment. Various general purpose systems can also be used together with the teaching based thereon. According to the above description, the structure required to construct this kind of system is obvious. Furthermore, the present invention is not directed to any particular programming languages. It is to be understood, that the contents of the present invention described here can be implemented by using various programming languages, and the description above made for a particular language is for the purpose of disclosure of the preferred embodiment of the present invention.

A large number of specific details are described in the specification provided herein. However, it can be understood, that the embodiments of the present invention can be implemented without these specific details. In some instances, the methods, structures and techniques that are well known are not showed in detail, so as not to obscure the understanding of this specification.

Similarly, it is to be understood, that to simplify the disclosure and help to understand one or more of respective inventive aspects, in the above description of the exemplary embodiments of the present invention, respective features of the present invention sometimes are together grouped into a single embodiment, drawings or the description therefore. However, the disclosed method shall not be construed as reflecting an intention that the present invention which is sought for protection requires more features than those explicitly recorded in each claim. More specifically, as reflected in the following claims, inventive aspects lie in that they are less than all features of a single embodiment disclosed previously. Therefore, claims following the specific embodiment are hereby explicitly incorporated in this specific embodiment, wherein each claim itself serves as a separate embodiment of the present invention.

It can be understood by those skilled in the art that, the modules in the equipment in an embodiment can be adaptively changed and provided in one or more equipment different from the embodiment. The modules or units or components in an embodiment can be combined to one module or unit or component, and further they can be divided into a plurality of sub-modules or subunits or subcomponents. Except that at least some of such features and/or procedures or units are mutually exclusive, any combination can be used to combine all features disclosed in the present specification (including the accompanying claims, abstract and drawings) and any method so disclosed or all procedures or units of the equipment. Unless otherwise explicitly stated, every feature disclosed in the present specification (including the accompanying claims, abstract and drawings) can be replaced by alternative features providing the same, equivalent or similar purpose.

Furthermore, it can be understood by those skilled in the art that, although some embodiments described herein include certain features included in other embodiments rather than other features, the combination of the features of the different embodiments means being within the scope of the present invention and form different embodiments. For example, in the following claims, any one of the embodiments sought for protection can be used in any combination.

The respective components of the embodiments of the present invention can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in the virus protection device in the electronic equipment according to the embodiments of the present invention. The present invention can also be implemented as an equipment or device program (e.g., a computer program and a computer program product) for executing some of all of the method described here. Such a program for implementing the present invention can be stored on a computer readable medium or can have a form of one or more signal. Such a signal can be downloaded from an Internet website or provided on a carrier signal or provided in any other form.

Figure 4:
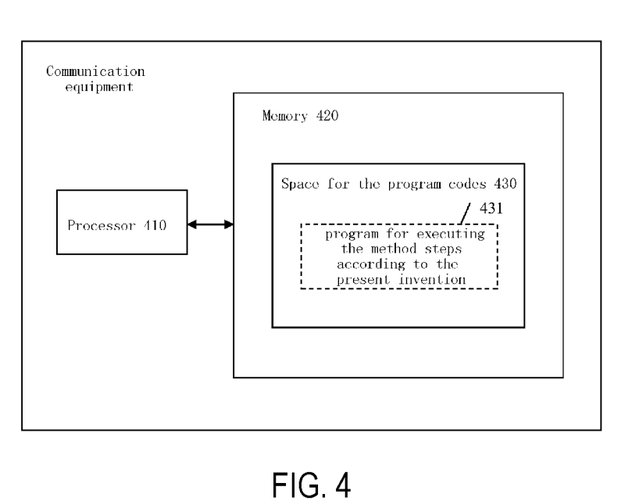
FIG. 4 shows a block diagram of a communication equipment for executing the method of the present invention.
Figure 5:
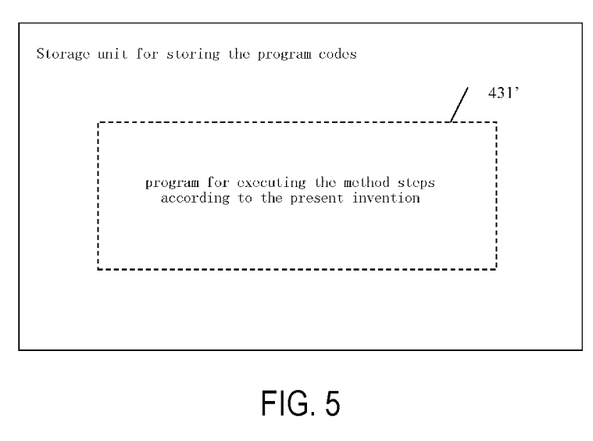
FIG. 5 shows a schematic diagram of a storage unit for holding or carrying program codes for implementing the method according to the present invention.

For example, FIG. 4 shows a communication equipment in which the virus protection method of the present invention can be implemented, such as an intelligent communication equipment, which traditionally includes a processor 410 and a computer program product or a computer readable medium in a form of a memory 420. The memory 420 can be an electronic memory such as a flash memory, an EEPROM (Electrically Erasable Programmable Read Only Memory), an EPROM, a hard disk or a ROM or the like. The memory 420 has a storage space 430 for program codes 431 for executing any method steps in the above method. For example, the storage space 430 for the program codes can include the respective program codes 431 for respectively implementing various steps in the above method. These program codes can be read out from or written into one or more computer program products. These computer program products include program code carriers such as a hard disk, a compact disk (CD), a memory card or a floppy disk. Such computer program products are generally portable or fixed storage units as described with reference to FIG. 5. The storage units can have storage sections or storage spaces, etc. arranged similar to those of the memory 420 in the communication equipment of FIG. 4. The program codes can be compressed for example in a suitable format. Generally, the storage units include the program 431' for executing the method steps according the present invention, that is, codes that can be read by a processor for example such as 410. When these codes are run by the communication equipment, the communication equipment is caused to execute respective steps in the above described method.

It should be noted that, the above described embodiments are used for explaining the present invention, rather than limiting the present invention, and an alternative embodiment can be designed by those skilled in the art without departing from the scope of the appended claims. In the claims, any reference symbol positioned between parentheses should not be considered the limiting of the claims. The word "include" does not exclude the existence of an element or a step that is not described in the claims. The word "a" or "an" positioned before an element does not exclude the existence of a plurality of such element. The present invention can be implemented by way of a hardware including several different elements and by way of a computer suitably programmed. In a unit claim enumerating several devices, several of these devices can be specifically implemented by the same hardware. The use of the word "first", "second" and "third", etc. does not represent any sequence. These words can be construed as a name.

The invention claimed is:

1. A virus protection method comprising:
    providing an application installation listening interface function in an application layer and providing a pre-installation package detection interface function of a security service in a framework layer, wherein the pre-installation package detection interface function is provided at the starting position of an application installation interface function;
    determining that an Android operating system needs to install an application when the application installation interface function in a package management service of the Android operating system is called;
    transmitting, in response to determining that the Android operating system needs to install the application, identification information of the application that needs to be installed from the framework layer to the application layer, wherein the transmitting includes: in the case that the application installation interface function in a package management service of the Android operating system is called, transmitting, by the application installation interface function, the identification information of the application that needs to be installed to the application installation listening interface function through the pre-installation package detection interface function;
    activating, at the application layer, a virus scanner application on the basis of the identification information of the application, to allow the virus scanner application to run virus scan on the application;
    acquiring a scan result of the virus scan, and issuing a notification to the framework layer of whether or not to execute an installation operation for the application on the basis of the scan result;
    determining, at the framework layer, whether to execute the installation operation for the application or reject the installation operation for the application on the basis of the notification, wherein issuing the notification includes:
    issuing the notification directly to the framework layer of whether or not to execute the installation operation for the application on the basis of the virus scan result; or
    presenting the virus scan result to a user, and issuing the notification to the framework layer of whether or not to execute the installation operation for the application on the basis of instruction information input by the user, in the case that the virus scan result is that the application is carrying a virus.

2. The method according to claim 1, wherein, saving, by the pre-installation package detection interface function, live data for application installation, and stopping, by the application installation interface function, the installation operation.

3. The method according to claim 2, wherein the transmitting, by the application installation interface function, the identification information of the application that needs to be installed to the application installation listening interface function through the pre-installation package detection interface function includes:
    when the application installation interface function is called, calling, by the application installation interface function, the pre-installation package detection interface function;
    acquiring, by the pre-installation package detection interface function, names of all callback functions from an application installation listener set, and the name of the application installation listening interface function being included in the application installation listener set;
    transmitting, by the pre-installation package detection interface function, the identification information of the application that needs to be installed to all the callback functions on the basis of the names of the callback functions.

4. The method according to claim 3, wherein the method further comprises:
    setting the name of the application installation listening interface function in the application installation listener set of the framework layer.

5. The method according to claim 1, wherein the identification information of the application includes a URI of the application.

6. The method according to claim 1, wherein the issuing the notification to the framework layer of whether or not to execute the installation operation for the application on the basis of the scan result includes:
    calling an application installation resuming class function or an application installation terminating class function provided by the service of the framework layer on the basis of the scan result by using an application installation resuming class function or an application installation terminating class function in the application layer, to issue the notification to the framework layer of whether or not to execute the installation operation for the application.

7. The method according to claim 1, wherein the method further includes:
    deleting the application directly in the case that the virus scan result is that the application is carrying a virus; or
    presenting to a user information as to whether or not delete the application, and deleting/not deleting the application on the basis of instruction information input by the user, in the case that the virus scan result is that the application is carrying a virus.

8. A virus protection device, comprising one or more non-transitory computer readable medium configured to store computer-executable instruction and at least one processor to execute the instructions to cause:
    provide an application installation listening interface function in an application layer and provide a pre-installation package detection interface function of a security service in a framework layer, wherein the pre-installation package detection interface function is provided at the starting position of an application installation interface function;

determine that an Android operating system needs to install an application when the application installation interface function in a package management service of the Android operating system is called;

transmit, in response to determining that the Android operating system needs to install the application, identification information of the application that needs to be installed from the framework layer to the application layer, wherein the transmitting includes: in the case that the application installation interface function in a package management service of the Android operating system is called, transmit, by the application installation interface function, the identification information of the application that needs to be installed to the application installation listening interface function through the pre-installation package detection interface function;

activate, at the application layer, a virus scanner application on the basis of the identification information of the application, to allow the virus scanner application to run virus scan on the application;

acquire a scan result of the virus scan, and issue a notification to the framework layer of whether or not to execute an installation operation for the application on the basis of the scan result;

determine, at the framework layer, whether to execute the installation operation for the application or reject the installation operation for the application on the basis of the notification, wherein issuing the notification includes:

issue the notification directly to the framework layer of whether or not to execute the installation operation for the application on the basis of the virus scan result; or present the virus scan result to a user, and issue the notification to the framework layer of whether or not to execute the installation operation for the application on the basis of instruction information input by the user, in the case that the virus scan result is that the application is carrying a virus.

9. The device according to claim 8, wherein the processor further executes the instructions to cause:

saving, by the pre-installation package detection interface function, live data for application installation, and stopping, by the application installation interface function, the installation operation.

10. The device according to claim 9, wherein the transmitting, by the application installation interface function, the identification information of the application that needs to be installed to the application installation listening interface function through the pre-installation package detection interface function includes:

when the application installation interface function is called, calling, by the application installation interface function, the pre-installation package detection interface function;

acquiring, by the pre-installation package detection interface function, names of all callback functions from an application installation listener set, and the name of the application installation listening interface function being included in the application installation listener set;

transmitting, by the pre-installation package detection interface function, the identification information of the application that needs to be installed to all the callback functions on the basis of the names of the callback functions.

11. The device according to claim 10, wherein the processor further executes the instructions to cause:

setting the name of the application installation listening interface function in the application installation listener set of the framework layer.

12. The device according to claim 8, wherein the identification information of the application includes a URI of the application.

13. The device according to claim 8, wherein the issuing the notification to the framework layer of whether or not to execute the installation operation for the application on the basis of the scan result includes:

calling, an application installation resuming class function or an application installation terminating class function provided by the service of the framework layer on the basis of the scan result by using an application installation resuming class function or an application installation terminating class function in the application layer, to issue the notification to the framework layer of whether or not to execute the installation operation for the application.

14. The device according to claim 8, wherein the processor further executes the instructions to cause:

deleting the application directly in the case that the virus scan result is that the application is carrying a virus; or presenting to a user information as to whether or not delete the application, and deleting/not deleting the application on the basis of instruction information input by the user, in the case that the virus scan result is that the application is carrying a virus.

15. A non-transitory computer readable medium in which having instructions stored thereon that, when executed by at least one processor, cause the at least one processor to perform operations for virus protection, which comprises the steps of:

providing an application installation listening interface function in an application layer and providing a pre-installation package detection interface function of a security service in a framework layer, wherein the pre-installation package detection interface function is provided at the starting position of an application installation interface function;

determining that an Android operating system needs to install an application when the application installation interface function in a package management service of the Android operating system is called;

transmitting, in response to determining that the Android operating system needs to install the application, identification information of the application that needs to be installed from the framework layer to the application layer, wherein the transmitting includes: in the case that the application installation interface function in a package management service of the Android operating system is called, transmitting, by the application installation interface function, the identification information of the application that needs to be installed to the application installation listening interface function through the pre-installation package detection interface function;

activating, at the application layer, a virus scanner application on the basis of the identification information of the application, to allow the virus scanner application to run virus scan on the application;

acquiring a scan result of the virus scan, and issue a notification to the framework layer of whether or not to execute an installation operation for the application on the basis of the scan result;

determining, at the framework layer, whether to execute the installation operation for the application or reject the installation operation for the application on the basis of the notification, wherein issuing the notification includes:

issuing the notification directly to the framework layer of whether or not to execute the installation operation for the application on the basis of the virus scan result; or presenting the virus scan result to a user, and issue the notification to the framework layer of whether or not to execute the installation operation for the application on the basis of instruction information input by the user, in the case that the virus scan result is that the application is carrying a virus.

* * * * *